United States Patent [19]

Daniel et al.

[11] Patent Number: 5,355,426
[45] Date of Patent: Oct. 11, 1994

[54] BROADBAND MXN OPTICAL FIBER COUPLERS AND METHOD OF MAKING

[75] Inventors: Hani S. Daniel, Rockville; Douglas R. Moore, Severna Park; Vincent J. Tekippe, Millersville, all of Md.

[73] Assignee: Gould Electronics Inc., Eastlake, Ohio

[21] Appl. No.: 939,011

[22] Filed: Sep. 2, 1992

[51] Int. Cl.$^5$ .................. G02B 6/26; C03B 23/20
[52] U.S. Cl. .......................... 385/39; 385/27; 385/30; 385/42; 385/43; 385/46; 385/45; 385/50; 385/51; 65/409; 65/411
[58] Field of Search ............ 385/27, 28, 30, 39, 385/42, 43, 45, 46, 50, 51; 65/4.1, 4.2, 4.3

[56] References Cited

U.S. PATENT DOCUMENTS

| | | | |
|---|---|---|---|
| 4,449,781 | 5/1984 | Lightstone et al. | 385/43 |
| 4,533,208 | 8/1985 | Stowe | 385/46 |
| 4,586,784 | 5/1986 | Tremblay et al. | 385/43 X |
| 4,687,284 | 8/1987 | Rawson et al. | 385/43 |
| 4,737,026 | 4/1988 | Dalgoutte et al. | 356/73.1 |
| 4,773,924 | 9/1988 | Berkey | 385/43 X |
| 4,834,481 | 5/1989 | Lawson et al. | 385/44 |
| 4,836,644 | 6/1989 | Eisenmann et al. | 385/43 X |
| 4,863,231 | 9/1989 | Byron et al. | 385/46 |
| 4,904,043 | 2/1990 | Schweizer | 385/35 X |
| 4,997,248 | 3/1991 | Stowe | 385/43 X |
| 5,054,874 | 10/1991 | Hill et al. | 385/43 X |
| 5,066,087 | 11/1991 | Yamauchi et al. | 385/43 |
| 5,073,314 | 12/1991 | Coutandin et al. | 264/1.5 |
| 5,077,817 | 12/1991 | Shang | 385/43 X |
| 5,095,516 | 3/1992 | Sasaki et al. | 385/43 |
| 5,119,453 | 6/1992 | Gonthier et al. | 385/43 |
| 5,121,452 | 6/1992 | Stowe et al. | 385/43 X |
| 5,171,345 | 12/1992 | Takemura | 385/43 X |
| 5,251,276 | 10/1993 | Berkey et al. | 385/43 |
| 5,251,277 | 10/1993 | Young, Jr. | 385/43 |
| 5,295,210 | 3/1994 | Nolan et al. | 385/43 |
| 5,295,211 | 3/1994 | Weidman | 385/43 |

OTHER PUBLICATIONS

"Singlemode MXN Star Couplers Fabricated Using Fused Biconical Taper Techniques", Daniel et al., SPIE vol. 1365 Components for Fiber Optic Applications V (1990) pp. 53–59.

"Unitary Trees and Stars for Subscriber Loop Applications", Campbell et al., SPIE vol. 1578 Fiber Networks for Telephony and CATV (1991) pp. 163–169.

"Wavelength-Flattened Fused Couplers", Mortimore, Electronics Letters, vol. 21, No. 178 (1985) pp. 742–743.

"Theory and Fabrication of Wavelength Flattened 1×N Single-Mode Coupleres", Mortimore et al., Applied Optics vol. 29, No. 124 (1990) pp. 1814–1818.

"Theory and Fabrication of 4×4 Single-Mode Fused Optical Fiber Couplers", Applied Optics, vol. 29, No. 3, pp. 371–374 Jan. (1990).

"Monolithic Wave Length-Flattened 1×7 Single-Mode Fused Fiber Couplers: Theory, Fabrication and Analysis", Mortimore et al., Applied Optics, vol. 30 No. 62 (1991) pp. 650–659.

"Monolithic 1×19 Single-Mode Fused Fibre Couplers", Arkwright et al., Electronics Letters vol. 27, No. 9 pp. 737–738 4(1991).

"Monolithic 4×4 Single-Mode Fused Coupler", Mortimore, 3(1989). Electronics Lett.

"Monolithic Wave Length-Flattened 1×7 Single-Mode Fused Coupler", Mortimore et al., Electronics Letters, vol. 25, No. 9 4(1989) pp. 606–607.

*Primary Examiner*—Brian Healy
*Attorney, Agent, or Firm*—Renner, Otto, Boisselle & Sklar

[57] ABSTRACT

A broadband optical fiber coupler comprising at least three continuous optical fibers fused at a region of coupling, at least one of the continuous optical fibers being dissimilar to others of the continuous optical fibers in the region of coupling, the region of coupling being of a length and the dissimilarity being of a degree to provide broadband response over a predetermined range of wavelengths. A related method for making a broadband optical fiber coupler is also disclosed.

9 Claims, 3 Drawing Sheets

BROADBAND MXN OPTICAL FIBER COUPLERS AND METHOD OF MAKING

FIELD OF THE INVENTION

The invention relates generally to passive optical couplers, and, more particularly, to biconically tapered optical couplers with more than two outputs operable over a broad wavelength region.

BACKGROUND OF THE INVENTION

Fiber optics are widely used in many diverse applications, including telecommunication systems, instrumentation and sensing operations. An example of such an application is a multi-access optical telecommunications network. In such a network, optical fiber connects a number of users or subscribers to a central office using passive couplers. This type of network is particularly attractive since there are typically no active optical devices located outside of the central office or subscriber locations.

An optical fiber typically includes an inner glass or plastic core surrounded by an outer cladding similarly of glass or plastic. The inner core has a relatively higher index of refraction than the cladding thus allowing light to be transmitted through the core very efficiently. Light may be transferred or split between separate fibers through the use of an optical fiber coupler. One extensively used type of optical fiber coupler is a fused biconically tapered (FBT) coupler. In one method of producing such a fiber optic coupler, a number of optical fibers are held in axial alignment and elongated while being heated. This process creates a biconically tapered region or waist wherein the optical fibers are fused together and the optical signals from one or more optical fibers can be coupled to or split between other optical fibers.

The basic optical performance of optical fiber couplers can be described by three fundamental quantities: excess loss, splitting loss and uniformity. The excess loss, expressed in decibels (dB), is a measure of how much light or optical energy is lost in the coupling process. Excess loss is defined as the ratio of the total output power to the amount of optical power launched into the input of the coupler. The ratio of the optical power in one of the output fibers relative to the total optical power output over all the output fibers is known as the splitting loss. The splitting loss is also often expressed in decibels. Another term often used to characterize the actual optical performance of couplers is "uniformity". Uniformity is a measure of the spread in the splitting ratios from the ideal values. It is also expressed in decibels and is defined as the difference between the maximum and minimum values of splitting loss.

Many of the optical fiber couplers in use today are designed to operate effectively over only a narrow range or "window" of wavelengths. The most common wavelengths of interest for telecommunication applications are those centered around 1300 nm or 1550 nm. These optical fiber couplers, often called single window couplers, essentially provide equal splitting of light from one or more input fibers to a number of output fibers at a preselected wavelength.

However, the splitting loss of each output port for such a single window coupler changes as a function of the wavelength of the transmitted light. In particular, as the wavelength of the transmitted light varies from the center of the wavelength window, the optical power in the output fibers (i.e., splitting loss) tend to diverge from the ideal value and the uniformity becomes quite large. This behavior typically limits the use of such single window couplers to within ±20 nm of the center of the wavelength window.

In many optical fiber telecommunication applications, operation in two wavelength windows, such as 1300 nm and 1550 nm, is required in order to provide both telephony and broadband services. In these applications broadband optical fiber couplers, which exhibit a relatively constant splitting loss over a broad range of wavelengths, are required.

One technique of fabricating a broadband optical fiber coupler requires introducing a dissimilarity in one of two optical fibers in the coupling region. This technique, however, has been limited to producing couplers with only two output fibers. Other techniques which allow splitting over more than two output fibers are known, but they are limited to $1 \times N$ couplers. One such technique involves inserting identical stripped optical fibers into a tight fitting outer sheath consisting of a glass capillary tube. The entire structure is then heated and stretched to achieve coupling. By varying the number of fibers inserted into the glass sheath and their relative positions and separations, certain broadband $1 \times N$ couplers can be fabricated. However, most of these $1 \times N$ couplers require either the use of $N+1$ fibers or the use of dummy fibers that have no light guiding cores and as such are not conventional optical fibers.

It would be desirable to provide an $M \times N$ broadband optical fiber coupler, where M ranges from 1 to N and N is greater than 2, that is easily fabricated and has good uniformity and splitting ratios and low excess losses.

SUMMARY OF THE INVENTION

The broadband $M \times N$ optical fiber couplers of the present invention utilize a relatively easy fabrication technique which involves combining dissimilar optical fibers. The desired dissimilarity in the fibers may be achieved by a number of methods prior to assembly. Such methods include reducing the size of the optical fibers by etching, pretapering or polishing techniques, doping the optical fiber core or cladding differently, diffusing existing dopants into other areas of the fiber, depositing additional glass material on the optical fiber and exposing the fibers to electromagnetic or nuclear radiation. Alternatively, fibers designed to have different parameters, such as core and cladding diameters, propagation constants and refractive index profiles, may be used.

In accordance with one aspect of the present invention, a process for fabricating a broadband fiber optic coupler includes creating a dissimilarity in at least one of at least three continuous optical fibers, arranging the continuous optical fibers in relative axial alignment and in intimate contact, and heating, elongating and fusing the continuous optical fibers together to achieve coupling.

In accordance with another aspect of the invention, a broadband optical fiber coupler includes at least three continuous optical fibers fused at a region of coupling, at least one of the continuous optical fibers being dissimilar to others of the continuous optical fibers in the region of coupling, the region of coupling being of a length and the dissimilarity being of a degree to provide broadband response over a predetermined range of wavelengths.

The foregoing and other features of the invention are hereinafter fully described and particularly pointed out in the claims, the following description and the annexed drawings setting forth in detail a certain illustrative embodiment of the invention, this being indicative, however, of but one of the various ways in which the principles of the invention may be employed.

DETAILED DESCRIPTION OF THE PREFERRED EMBODIMENT OF THE INVENTION

Figure 1:
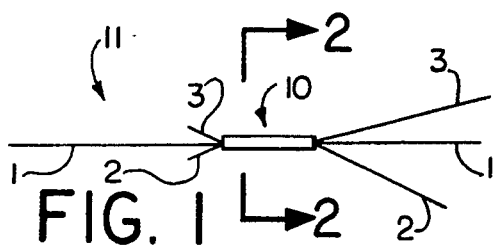
FIG. 1 is a schematic illustration of a 1×3 broadband fiber optic coupler and associated optical fibers constructed in accordance with the invention.

With reference to the figures, and initially to FIG. 1, there is illustrated a broadband 1×3 optical fiber coupler 10 in accordance with the present invention. The coupler 10 optically couples light from an input optical fiber 1 to output optical fibers 1, 2 and 3. Note that the input optical fibers 1, 2 and 3 are continuous throughout the coupler and become the output fibers downstream of the coupling region 10. In this embodiment only fiber 1 is used as the input fiber with fibers 2 and 3 unused on the input side 11 of the coupler. The optical fibers 1, 2 and 3 are each made of a light transmitting glass core surrounded by a similar glass cladding with a relatively lower index of refraction than the core. An example of a suitable optical fiber is standard single mode telecommunications fiber, such as that made by Corning Glass Works and identified as SMF28 ™. Alternatively, a multimode optical fiber could be used. The optical fibers are fused together in the coupling region, preferably using a fused biconical taper technique as will be described more fully below.

Figure 2:
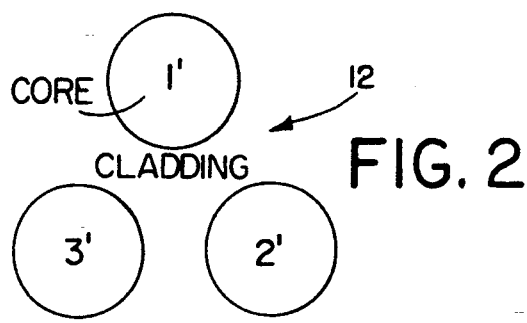
FIG. 2 is a cross section of the coupler viewed along the line 2—2 in FIG. 1.

Referring to FIG. 2 there is shown a cross-section of the optical fibers 1, 2 and 3 in the fused area of the coupler 10. The cores of optical fibers 1, 2, 3 are denoted by reference numerals 1', 2' and 3', respectively. The claddings (referenced generally as 12) of the optical fibers 1, 2 and 3 are coalesced by the fusion process and occupy the area between the fiber cores 1', 2' and 3' and areas immediately surrounding the cores (the boundary of the cladding 12 is not shown). For the purpose of discussion the desired dissimilarities in the optical fibers are assumed to be achieved by using fibers having different core diameters.

The core 1' of input fiber 1 is slightly smaller in diameter than the cores 2' and 3' of optical fibers 2 and 3, respectively. Cores 2' and 3' have equal diameters in this example. This dissimilarity in the core diameters provides the desired dissimilarity in the propagation constants of the optical fibers when coupled. In reality the dissimilarity in the fibers can be achieved through a variety of methods, a dissimilarity in the core diameters of the optical fibers being only one method. Moreover, while the core 1' is shown as having a relatively smaller diameter than cores 2' and 3', other combinations of diameter dissimilarities can be employed.

The exchange or coupling of optical power among the fibers in couplers may be described using coupled mode theory. Coupled mode theory is based on a perturbation approach which assumes that the optical fibers are electromagnetically well isolated. A more in-depth discussion of coupled mode theory can be found in "Optical Waveguide Theory" by A. W. Snyder and J. D. Love, Chapman and Hall (1983), Chapter 29.

The coupling behavior of the 1×3 optical fiber coupler 10 is described by the following set of two coupled mode equations:

$$\frac{da_1}{dz} + j\beta_1 a_1 = -2jC_a a_2 \quad (1)$$

$$\frac{da_2}{dz} + j\beta_2 a_2 = -jC_a a_1 - jC_a a_2$$

where $\beta_1$ is the propagation constant of the fundamental mode of input fiber 1 and $\beta_2$ is that of identical fibers 2 and 3; $C_a$ is the coupling constant between the optical fibers; $a_1$ is the modal amplitude of fiber 1 and $a_2$ is the modal amplitude of fibers 2 and 3; and z is the interaction length over which the coupling occurs.

Substituting the expression $a_n = A_n \exp(-j\lambda z)$ into the set of equations 1, leads to the characteristic eigenvalue equation in matrix form:

$$\begin{vmatrix} (-\lambda + \beta_1) & 2C_a \\ C_a & (-\lambda + \beta_2 + C_a) \end{vmatrix} = 0 \quad (2)$$

The matrix above is solved numerically to determine its eigenvalues. The associated eigenvectors are subsequently determined algebraically. The modal amplitudes $a_1$ and $a_2$ can then be represented by the following two equations:

$$a_1 = A_{11}\exp(-j\lambda_1 z) + A_{12}\exp(-j\lambda_2 z)$$

$$a_2 = A_{21}\exp(-j\lambda_1 z) + A_{22}\exp(-j\lambda_2 z) \quad (3)$$

where $\lambda_1$ is one eigenvalue and $A_{n1}$ is its associated eigenvector after applying the boundary condition for the normalized coupled power for the fibers at a coupling length $z=0$. Representing the normalized coupled power as Pn, where "n" is the optical fiber, the boundary condition at the point $z=0$ is P1=1 and P2=P3=0.

Figure 3:
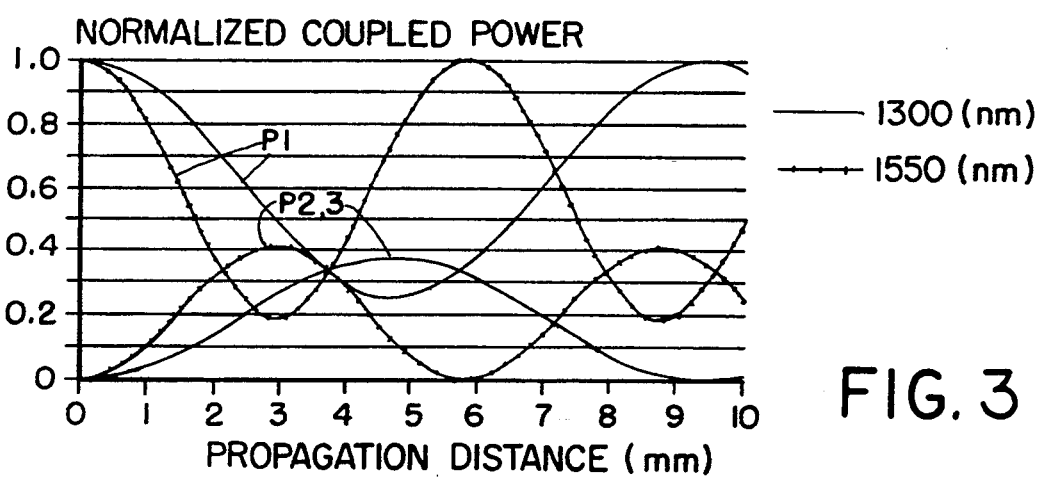
FIG. 3 is a graph of normalized coupled power as a function of coupling length for the optical fibers coupled by the coupler of FIG. 1 for the optical wavelengths of 1300 nm and 1550 nm.

The coupled power carried by each of the three fibers plotted as a function of the coupling length z, for both 1300 and 1550 nm, is graphically depicted in FIG. 3. At a coupling length z equal to approximately 3.7 mm, the coupler 10 exhibits broadband behavior by providing an equal three-way split for both wavelengths simultaneously.

While the above discussion is for a broadband 1×3 optical fiber coupler, the example is illustrative and the principles can be extended to other 1×N arrays where N is greater than 2. Further, the invention can be applied to both single mode and multimode optical fibers.

Figure 4:
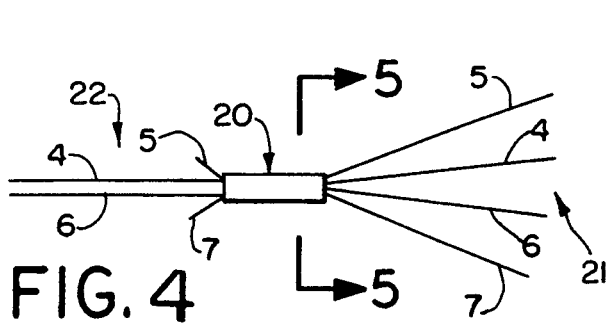
FIG. 4 is a schematic illustration of a 2×4 broadband fiber optic coupler and associated optical fibers constructed in accordance with the invention.

Referring now to FIG. 4, there is shown a broadband 2×4 optical fiber coupler 20 optically coupling fibers 4, 5, 6 and 7. Note that all four fibers 4, 5, 6 and 7 are continuous throughout the coupler 20 thus providing four output fibers on the right or output side 21 of the coupler 20. In this embodiment, optical fibers 4 and 6 to the left side or input side 22 of the coupler 20 in the figure represent the input fibers with fibers 5 and 7 being unused on the input side.

Again, the optical fibers 4, 5, 6 and 7 are each made of a light transmitting glass core surrounded by a similar glass cladding with a relatively lower index of refraction than the core, for example SMF28 TM by Corning Glass Works. The optical fibers are also fused together in the coupling region, preferably using the fused biconical taper technique described more fully below.

Figure 5:
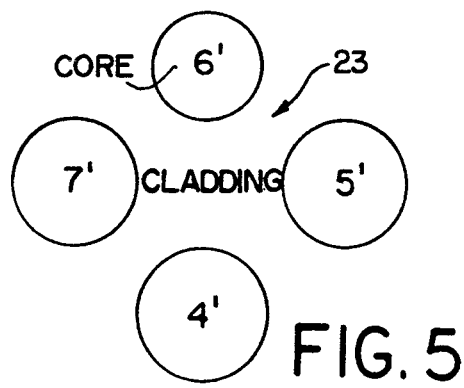
FIG. 5 is a cross section of the coupler viewed along the line 5—5 in FIG. 4.

FIG. 5 illustrates a cross-section of the optical fibers 4, 5, 6 and 7 in the area of the coupler 20. The cores of optical fibers 4, 5, 6 and 7 are denoted by like primed reference numerals. The claddings (referenced generally as 23) of the optical fibers 4, 5, 6 and 7 are merged by the fusion process and occupy the area between the fiber cores 4', 5', 6' and 7' and areas immediately surrounding the cores (the boundary of the cladding 23 is not shown).

As illustrated in FIG. 5, the core 4' of input fiber 4 is slightly larger in diameter than the cores 5' and 7' of optical fibers 5 and 7, respectively, with the diameter of core 6' of optical fiber 6 being smaller than the diameter of cores 5' and 7'. The cores 5' and 7' are of equal diameter in this example. Once again, for the purpose of discussion, the dissimilarities in the optical fibers are being illustrated by different core diameters, although the desired dissimilarities in the propagation constants of the optical fibers once coupled could be accomplished in many other ways, some of which are enumerated herein. Other combinations of core diameter dissimilarities also can be employed which meet the core diameter ratio requirements set forth in equation 4 below.

The broadband 2×4 fiber coupler 20 is implemented with core diameters 4', 5', 6' and 7' determined according to the following ratio:

$$\frac{\rho_5}{\rho_4} = \frac{\rho_7}{\rho_4} = \frac{\rho_6}{\rho_5} = \frac{\rho_6}{\rho_7} \quad (4)$$

where $\rho_4$, $\rho_5$, $\rho_6$, and $\rho_7$ are the diameters of the cores 4', 5', 6', and 7', respectively.

The behavior of coupler 20 can be described by the following set of three coupled mode equations:

$$\frac{da_4}{dz} + j\beta_4 a_4 = -2jC_a a_5 \quad (5)$$

$$\frac{da_5}{dz} + j\beta_5 a_5 = -jC_a a_4 - jC_a a_6$$

$$\frac{da_6}{dz} + j\beta_6 a_6 = -2jC_a a_5$$

where $\beta_4$ and $\beta_6$ are the propagation constants of fibers 4 and 6, respectively, and $\beta_5$ is the propagation constants of fibers 5 and 7 (assumed to be identical); $C_a$ is the coupling constant between the optical fibers; $a_4$ and $a_6$ are the modal amplitudes of fibers 4 and 6, respectively, and $a_5$ is the modal amplitude of fibers 5 and 7; and z is the interaction length over which the coupling occurs.

This leads to the characteristic equation in matrix form:

$$\begin{vmatrix} (-\lambda + \beta_4) & 2C_a & 0 \\ C_a & (-\lambda + \beta_5) & C_a \\ 0 & 2C_a & (-\lambda + \beta_6) \end{vmatrix} = 0 \quad (6)$$

which is solved in the manner described in the preceding section.

Figure 6:
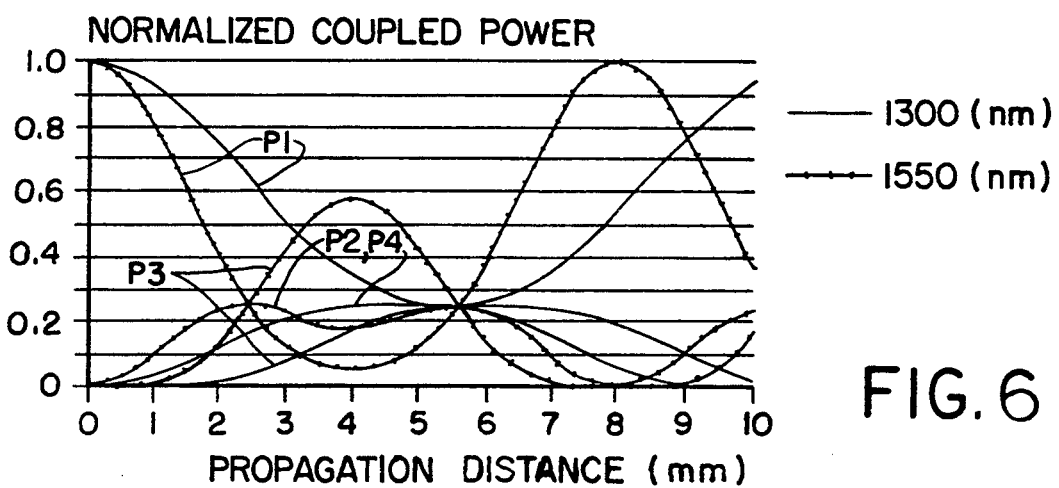
FIG. 6 is a graph of normalized coupled power as a function of coupling length for the optical fibers coupled by the coupler of FIG. 4 for the optical wavelengths of 1300 nm and 1550 nm.

The optical power carried by each of the four fibers 4, 5, 6 and 7 is plotted in FIG. 6 as a function of the coupling length z for both 1300 and 1550 nm light. The figure shows that at a coupling length z equal to 5.5 mm, the coupler 20 provides an equal four-way split at 1300 and 1550 nm simultaneously, thus enabling the broadband mode of operation of this type of coupler.

The broadband fiber optic couplers of the present invention are fabricated in a manner very similar to that used to construct standard 3×3 and 4×4 single window fused optical fiber couplers, with the addition of a step to introduce a dissimilarity in one or more of the fibers. The 1×3 and 2×4 optical fiber couplers described herein were fabricated as described below using two different methods to achieve the dissimilarities in the fibers. Other configurations of fused broadband couplers in accordance with the present invention could be fabricated in much the same way.

For the broadband 2×4 optical fiber coupler, four equal lengths of standard single mode telecommunications fiber (Corning SMF28 TM ) were cut. Twenty-five mm long sections of the protective buffers of each fiber were stripped, and the exposed glass portions cleaned. To create the desired dissimilarities in the fibers for the 2×4 optical fiber coupler, the appropriate fiber diameters were reduced with a glass etchant. Fibers 5, 6 and 7 were etched appropriately to maintain the relative outside fiber diameter ratios given in equation 4. Fiber 4 was not etched. For the broadband 1×3 optical fiber coupler, the dissimilarities in the optical fibers were achieved by pretapering the fibers. However, as discussed earlier, the desired dissimilarities in the fibers for either of these couplers could also have been achieved by a number of other methods. For instance, doping the optical fiber core or cladding differently, diffusing existing dopants into other areas of the fiber, using fibers of different diameters, using fibers made with different optical propagation constants, or using fibers made with different refractive index profiles. If the desired dissimilarities in the fibers are to be achieved by reducing the outside diameter, convenient methods are etching, pre-tapering, and polishing. Dissimilarities in the fiber can also be achieved by the deposition of additional glass or plastic material on the optical fiber.

The fibers were then mounted parallel to each other in a sliding mechanical fixture. The fibers are then braided and brought together in a closed bundle formation in order to achieve relative axial alignment and intimate side-by-side contact. Other mechanical means, fixtures, and/or adhesives could have also been used to achieve this alignment and contact.

The fiber bundles were fused using a fused biconical tapering process wherein the fibers were heated and elongated to form the coupler. During the fusion process, light was launched into an input fiber, and the optical outputs of the output fibers were monitored using germanium photodetectors. The fusion process was terminated when the input light was split evenly among the output fibers. The fusion process also can be monitored by using a 2×1 optomechanical switch alternatively to launch light at 1300 nm and 1550 nm into the input fiber during the fusion process. In this case the fusion process would be terminated once a minimum spread in the splitting loss is detected at both wavelengths. The heat for fusion can be supplied by any heat source with sufficient energy to achieve the temperature required for fusing, such as a gaseous flame, an electric furnace, or optical energy, i.e., a $CO_2$ laser.

In the preferred embodiment the coupler was secured into a silica substrate using an adhesive. Materials other than silica may be used for the substrate. The coupler was then inserted and sealed in a protective INVAR tube typically three millimeters in diameter and sixty-five millimeters in length. An outer housing other than the INVAR tube may also be used. Similarly, other attachment methods may be employed, such as laser welding or glass sealing materials, to secure the coupler to the silica substrate.

Figure 7:
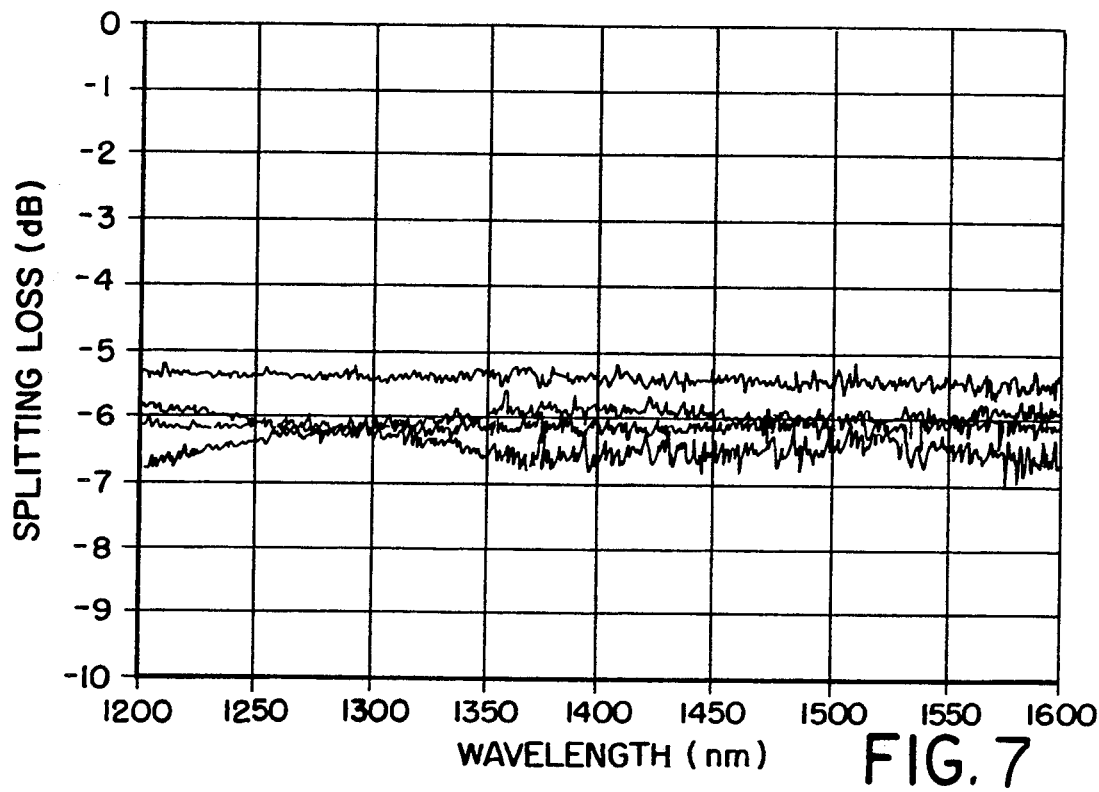
FIG. 7 is a graphical illustration of splitting loss as a function of wavelength for one input of a fused broadband 2×4 optical fiber coupler constructed in accordance with the present invention.
Figure 8:
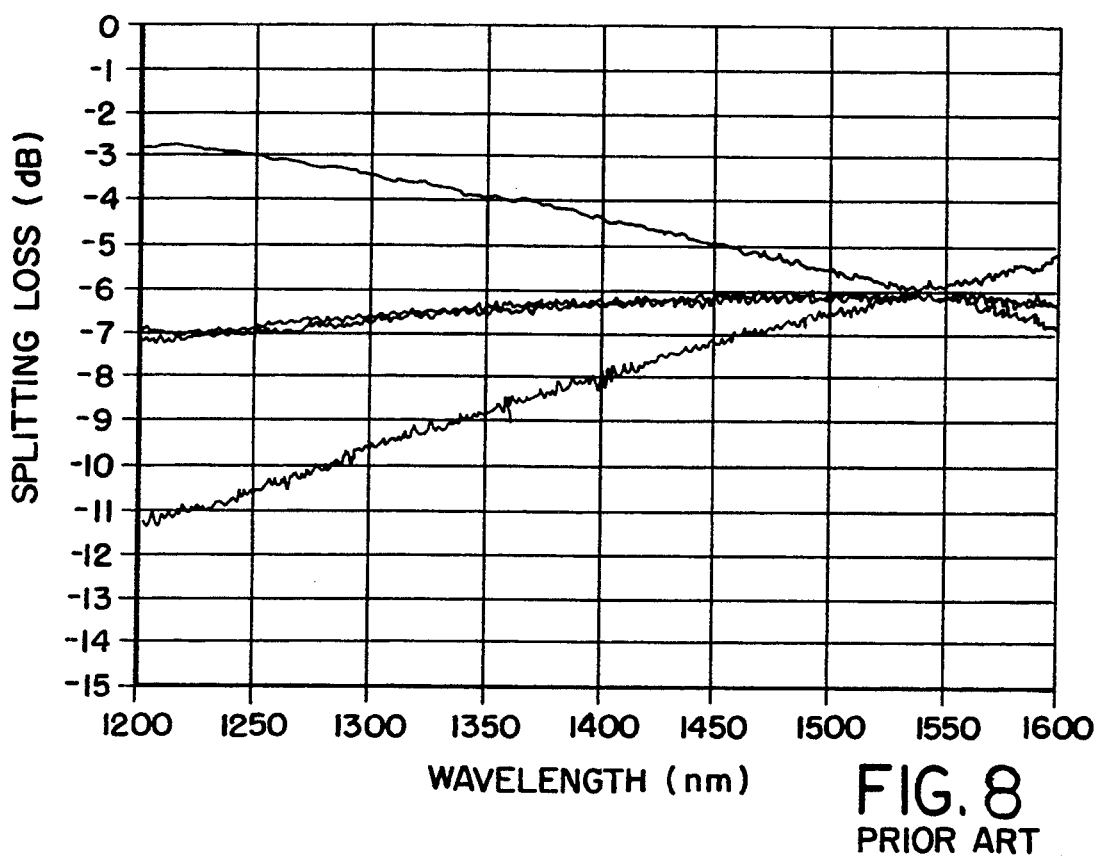
FIG. 8 is a graphical illustration of splitting loss as a function of wavelength for one input of a standard single window 4×4 fused optical fiber coupler intended for use in the 1550 nm wavelength region.

The performance of the fused broadband 2×4 and 1×3 optical fiber couplers was tested using a white light source and an optical spectrum analyzer. FIG. 7 is a graphical illustration of splitting loss as a function of wavelength for a broadband 2×4 optical fiber coupler fabricated in accordance with the present invention. The splitting loss for each of the four output fibers is relatively constant over the broad wavelength spectrum from 1200 nm to 1600 nm, and the uniformity is about 1.4 dB over the entire wavelength region. For comparison, the characteristics of a standard single window 4×4 fused coupler intended for use in the 1550 nm wavelength region is depicted in FIG. 8. The splitting losses of the standard 4×4 coupler diverge substantially from the ideal value of approximately 6 dB as the wavelength of input light varies from the center (1550 nm) of the wavelength window. Conversely, the splitting loss and uniformity of the 2×4 broadband coupler of the present invention exhibit minimal sensitivity to the operating wavelength as seen in FIG. 7.

Figure 9:
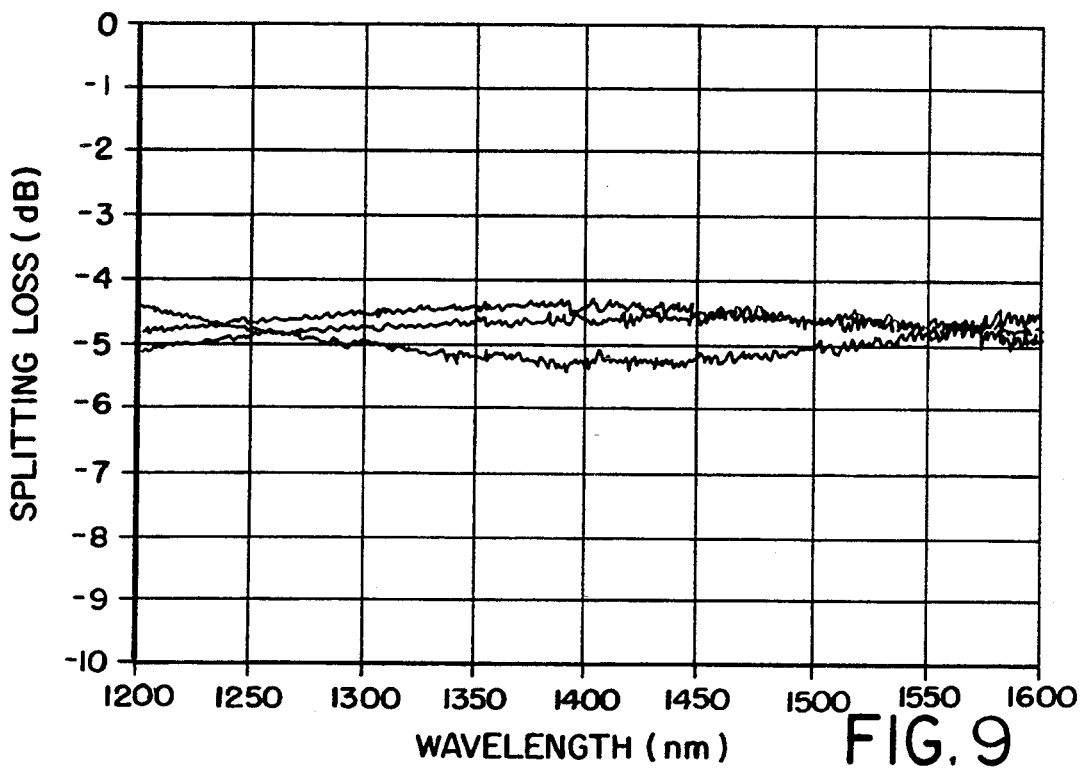
FIG. 9 is a graphical illustration of splitting loss as a function of wavelength showing the wavelength response of a fused broadband 1×3 fiber optic coupler constructed in accordance with the present invention.
Figure 10:
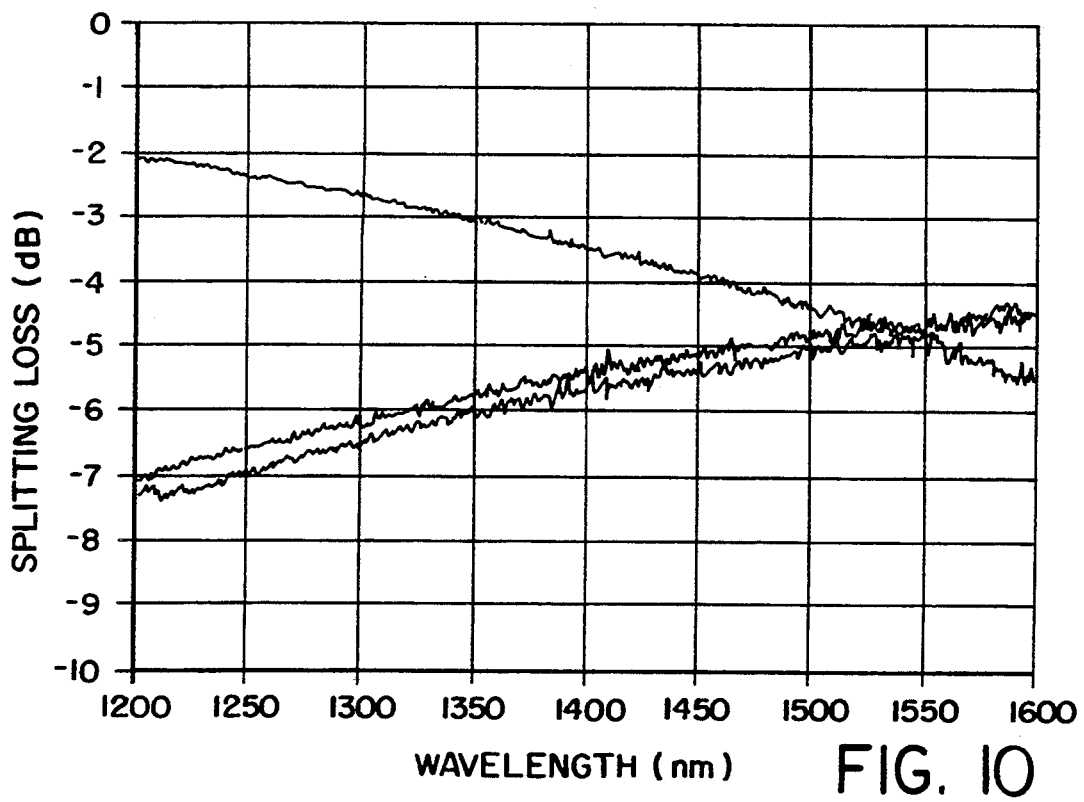
FIG. 10 is a graphical illustration of splitting loss as a function of wavelength for one input of a standard single window 3×3 fused optical fiber coupler intended for use in the 1550 nm wavelength region.

FIG. 9 is a graphical representation of splitting loss as a function of wavelength for a fused broadband 1×3 optical fiber coupler in accordance with the present invention. The uniformity of the splitting losses over the three optical fibers is approximately 0.5 dB at 1300 nm and approximately 0.1 dB at 1550 nm. Furthermore, the maximum uniformity throughout the wavelength region of 1200 nm to 1600 nm is less than 1 dB. In contrast, the corresponding response of a standard single window 3×3 fused fiber coupler intended to be used in the 1550 nm region is illustrated in FIG. 10. The splitting losses of the standard 3×3 coupler diverge substantially from the ideal value of approximately 4.8 dB as the wavelength of input light varies from the center (1550 nm) of the wavelength window. The substantially reduced wavelength sensitivity provided by the 1×3 broadband coupler of the present invention over a standard 3×3 coupler is clear from a comparison of FIGS. 9 and 10.

A comparison of the wavelength responses for the dual window optical fiber couplers constructed in accordance with the invention with the wavelength responses of standard fused optical fiber couplers indicates that the couplers of the present invention operate more uniformly over a broader wavelength spectrum than do the tested conventional devices. The optical couplers of the present invention also offer advantages over other known broadband optical fiber couplers in that standard fabrication equipment can be used and the complexity associated with using a sheathing capillary tube is avoided. Moreover, additional lengths of fiber do not need to be spliced or pigtailed in order to access the coupler, such as is the case with planar waveguide splitters, and the disadvantages associated with having to concatenate the required number of standard 2×2 broadband couplers also is avoided.

We claim:

1. A process for fabricating a 2×4 broadband fiber optic coupler, comprising the steps of:
   a) arranging four optical fibers relatively axially in intimate contact, with two of the four fibers being both launch fibers and output fibers, at least two of the four optical fibers having unequal core diameters in the area of coupling and the four optical fibers having core diameters in the area of coupling satisfying the relationship:

$$\frac{\rho_2}{\rho_1} = \frac{\rho_4}{\rho_1} = \frac{\rho_3}{\rho_2} = \frac{\rho_3}{\rho_4}$$

where $\rho_n$, with n being an integer between 1 and 4, represents the diameter of the core of a particular optical fiber; and
   b) heating, elongating and fusing said four optical fibers together to achieve broadband coupling.

2. A 1×3 broadband optical fiber coupler comprising three optical fibers fused at a region of coupling, with one of the three fibers being a launch optical fiber which is continuous through the region of coupling to provide an output fiber, the launch optical fiber being dissimilar to the other two optical fibers in the region of coupling, said region of coupling being of a length and said dissimilarity of said launch optical fiber being of a degree to provide broadband response over a predetermined range of wavelengths.

3. The process of claim 1, further including launching light into at least one of said optical fibers, monitoring the light output from at least one of said optical fibers, and terminating said step of heating, elongating and fusing when said output reaches a specified value.

4. The process of claim 1, wherein said step of heating, elongating and fusing includes using a biconical tapering technique.

5. The process of claim 1, wherein said optical fibers are single mode optical fibers.

6. The process of claim 1, wherein said optical fibers are multimode optical fibers.

7. The process of claim 1, wherein said step of arranging includes arranging said four optical fibers generally in a diamond configuration.

8. The coupler of claim 2, wherein said launch optical fiber has a different diameter than said other two optical fibers at the region of coupling.

9. The coupler of claim 2, wherein said launch optical fiber has a different propagation constant than said other two optical fibers at the region of coupling.

* * * * *